Jan. 7, 1964   L. J. CORKERY   3,116,581
CROP CONDITIONER
Filed March 20, 1961   3 Sheets-Sheet 1
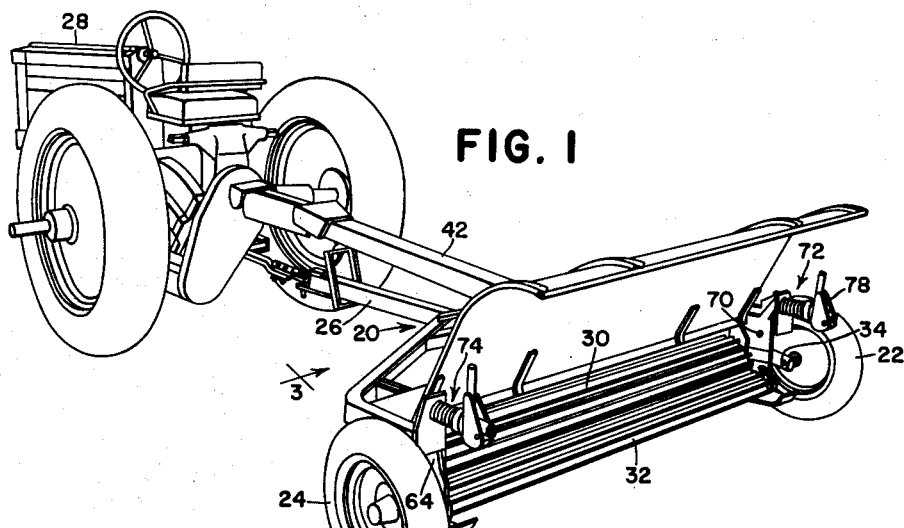
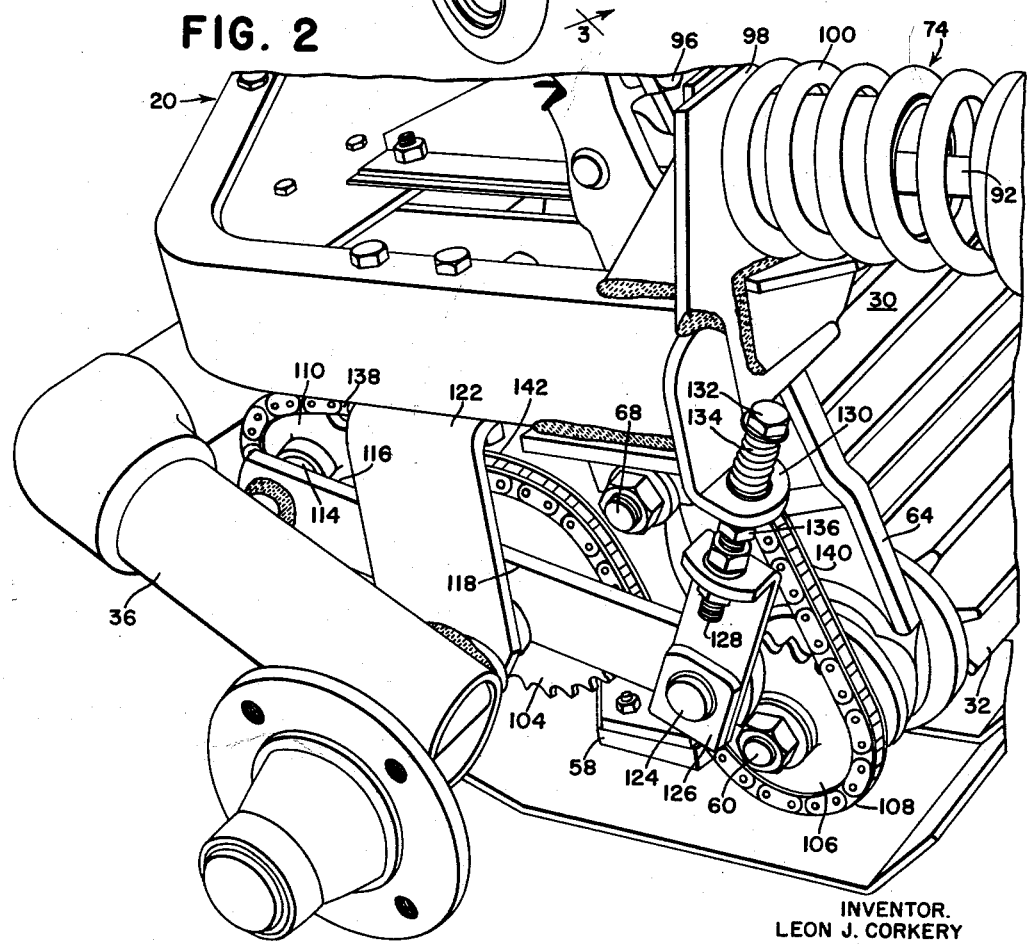
INVENTOR.
LEON J. CORKERY

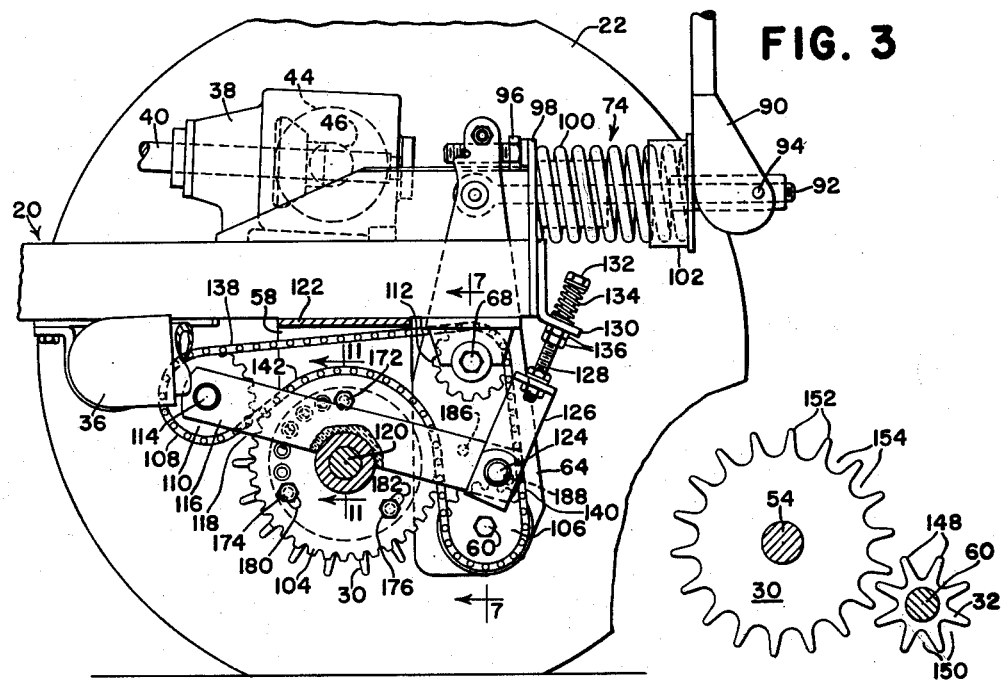
FIG. 3
FIG. 5
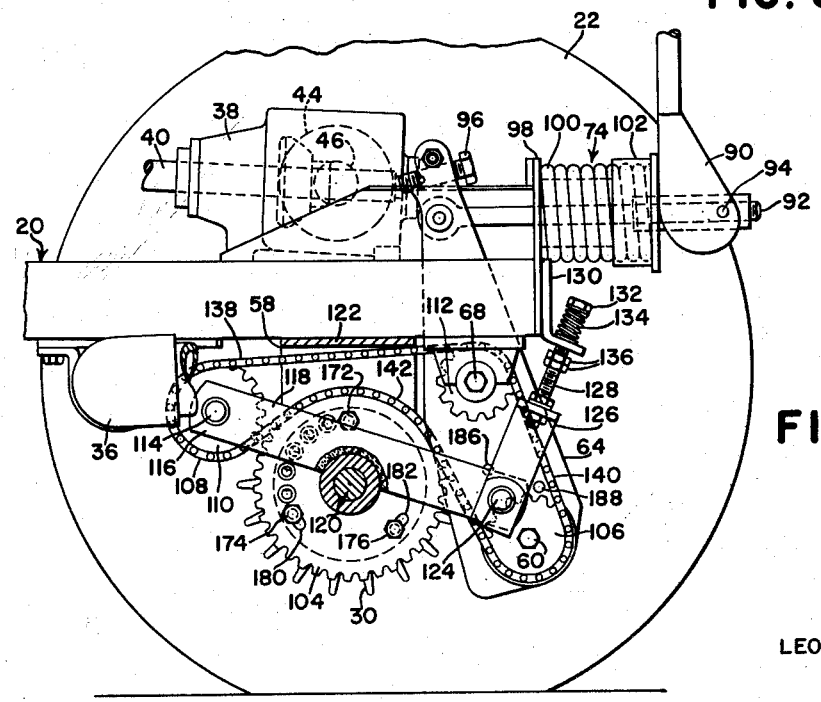
FIG. 4
*INVENTOR.*
LEON J. CORKERY

Jan. 7, 1964 L. J. CORKERY 3,116,581
CROP CONDITIONER
Filed March 20, 1961 3 Sheets-Sheet 3

*INVENTOR.*
LEON J. CORKERY

United States Patent Office 3,116,581
Patented Jan. 7, 1964

3,116,581
CROP CONDITIONER
Leon J. Corkery, Moline, Ill., assignor to Deere & Company, Moline, Ill., a corporation of Delaware
Filed Mar. 20, 1961, Ser. No. 97,085
13 Claims. (Cl. 56—1)

This invention relates to a crop conditioner and more particularly to improvements in means for mounting, driving and adjusting the conditioner rolls.

Crop conditioners as currently known in the agricultural industry may take several forms, the common characteristic of which is the use of a pair of rolls through which previously harvested crops are passed for the purpose of physically rupturing the stems of the crops to accelerate curing. In one form of crop conditioner, such as that shown in the U.S. patent to Cunningham 2,711,622, the rolls are of the meshing fluted or toothed type. Other machines employ mating smooth rolls, sometimes of different materials, and still other machines employ combinations of fluted and smooth rolls. In a machine of the Cunningham type, dependence has heretofore been placed on the meshing of the teeth of the rolls to establish the drive between the rolls. Machines of the type having rolls other than meshing rolls rely on drive chains for establishing counter-rotation of the rolls. The present invention provides improvements that may be employed in machines of any of the above types and particularly in those using meshing rolls.

One of the problems in a machine of the meshing fluted roll type is presented when these rolls are positively driven by a chain and sprocket drive, since the mesh of the teeth on the rolls must be timed or coordinated with the drive. Likewise, the rolls must be mounted so that they are capable of moving apart or spreading in response to overload conditions and this creates another problem in the chain drive, since idlers must be arranged to accommodate the relative movement of the rolls. Further problems arise because of manufacturing errors in the formation of keyways and the like in the roll shafts, which results in angular differences between the roll sprockets and the roll teeth which ultimately produce errors in timing. According to the present invention, these difficulties are eliminated by the provision of improved drive and mounting means whereby a driving chain is properly mounted with respect to a movable idler; the idler is arranged so that it does not tension the chain during normal operation; timing means is provided between one of the rolls and its sprocket so as to obtain relative angular adjustment between the sprocket and roll so as to ultimately produce correct timing of the roll relative to the other roll, the sprocket and the chain. Another object resides in the provision of indicator means by which the person making the adjustment can readily determine when the rolls are properly timed.

The foregoing and other important features and desirable objects, inherent in and encompassed by the invention, will become apparent as a preferred embodiment of the invention is disclosed in detail in the ensuing description and accompanying sheets of drawings, the figures of which are described below.

FIG. 1 is a perspective of a typical crop conditioner shown hitched to a tractor.

FIG. 2 is an enlarged fragmentary perspective of the left rear portion of the machine, the left wheel being removed to expose the adjacent structure.

FIG. 3 is a longitudinal section as seen generally along the lines 3—3 of FIG. 1 but with additional parts broken away to expose significant structure.

FIG. 4 is a view similar to FIG. 3 but showing the positions of the parts when one roll is displaced bodily relative to the other.

FIG. 5 is a simplified view showing the relationship between the two fluted rolls.

FIG. 6 is a longitudinal section as seen from the end of the machine opposite that at which FIG. 3 is seen, with certain portions omitted to expose significant structure.

Figure 6:
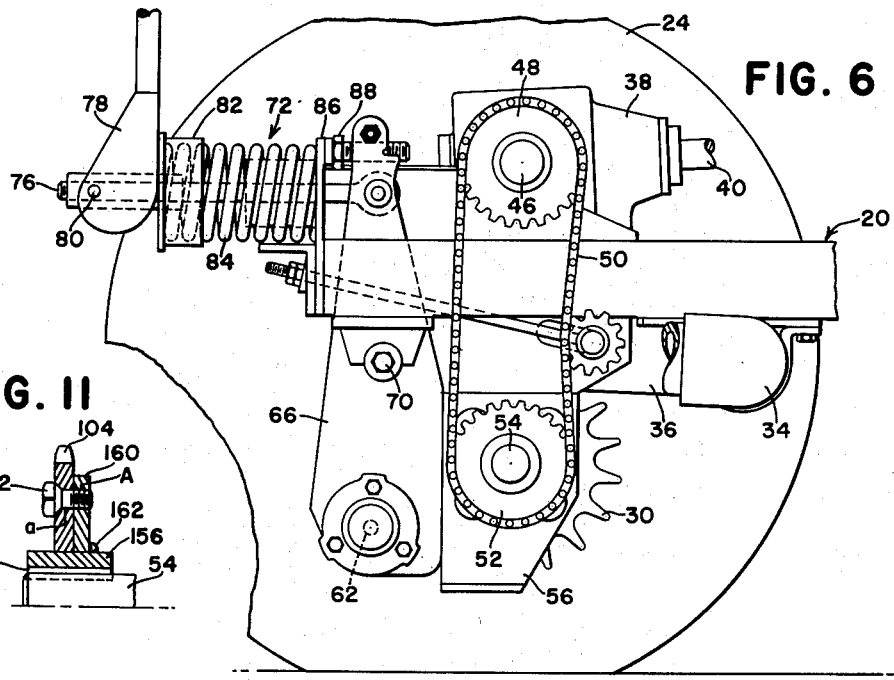

The crop conditioner chosen for purposes of illustration is, in its basic aspects, similar to that shown in the Cunningham patent, identified above, and to that extent has a fore-and-aft main frame 20 which is of substantial width as respects its line of advance. The frame is carried at laterally opposite ends by right- and left-hand wheels 22 and 24, respectively, and has a forwardly projecting draft tongue 26 which may be connected to a tractor 28 for advance over a field of previously harvested crops which are lying on the stubble in swaths following the mowing operation. The machine in this case carries cooperative counter-rotating front and rear rolls 30 and 32 which pick up the crops from the swath, pass it through the rolls for conditioning thereof and discharge the crops rearwardly to fall back upon the stubble, after which it is picked up, as for baling, with or without windrowing, depending upon conditions that are not material here.

The frame 20 is carried on the wheels 22 and 24 via right and left hand crank axles 34 and 36, and these may be properly adjusted, by mechanism not material here, to gauge the height of the rolls 30 and 32 above the ground. These details are fully explained in the above noted Cunningham patent and need not be repeated here. The frame additionally carries intermediate its opposite ends, as represented by the end portions of the frame respectively proximate to the wheels 22 and 24, a gear box 38 which receives input power from the power take-off of the tractor in a conventional manner. The input shaft for the gear box is shown at 40 and a shielded power line is shown at 42 in FIG. 1. The gear box contains appropriate bevel gearing, such as that shown in dotted lines at 44 in FIGS. 3 and 4, for driving a transverse shaft 46 which extends to the right of the machine and which has at its terminal end a sprocket 48 connected by a chain 50 to a sprocket 52 which is coaxially keyed to a shaft 54 to which the front or larger roll 30 is keyed.

The shaft 54 of course projects at opposite ends respectively beyond opposite ends of the roll 30 and is appropriately journalled on the frame 20, as by depending right and left hand supports 56 and 58. The shaft 54 may in fact be a pair of coaxial stub shafts or a continuous shaft, which details are largely immaterial here. This applies also to the shaft arrangement for the small or rear roll 32, which is here shown as having coaxial stub shafts at opposite ends, only one of which appears at 60 and the other of which is represented as to presence and location by a dotted circle 62 in FIG. 6.

The coaxial shafts 60 and 62 are appropriately journalled, in any suitable manner not material here, in lower portions of left and right hand carriers 64 and 66 and these in turn are mounted on the rear portion of the frame 20 by transversely coaxial pivots 68 and 70 respectively. This manner of mounting the lower roll 32 establishes means whereby this roll is carried on the frame for fore-and-aft swinging respectively toward or away from the front roll 30. In normal operating conditions, the relationship between the two rolls, as established by control of the carriers 64 and 66, is such that the teeth of the rolls will mesh as shown generally in FIG. 5. For this purpose, the carriers are under control of right and left hand biasing means 72 and 74, which may be identical to those disclosed in the patent to Coultas 2,843,990. Each biasing means acts on the principle of employing a spring to exert a rearward force on the upper end of its carrier so as to cause the lower end, which carries the lower roll 32, to swing forwardly. In the case of the right hand means 72, the upper end of the carrier 66 is connected to a threaded rod 76 on which is mounted a cam 78 swingable about a transverse axis 80. In normal position, the cam 78 abuts a cap 82 which confines a coiled spring 84 between the cap and a fixed member 86 on the frame 20. A stop 88 between the upper end of the carrier 66 and the member 86 limits forward swinging of the roll 32 toward the roll 30. This stop is of course adjustable. The cam 78 may be swung downwardly and rearwardly (counterclockwise as seen in FIG. 6) to relieve the compression on the spring 84 and thus to enable manual separation of the two rolls, as for the purpose of clearing a clogged condition.

The left hand means 74 is identically constructed, having a cam 90 mounted on a rod 92 by a transverse pin 94, the rod 92 acting on the upper end of the left hand carrier 64 which has an adjustable stop 96 for normal engagement with the fixed member 98 on the frame 20. A coil spring 100 acts between the member 98 and a cap 102 which is abutted by the cam 90. In the case of either means 72 or 74, its cam may be rotated on its threaded rod for the purpose of varying the load on the spring with which these parts are associated.

FIG. 3 shows the normal relationship of the parts, with the rolls 30 and 32 running in normal or proper relationship. FIG. 4 shows the rear roll 32 displaced rearwardly from the front roll 30 as the carriers 64 and 66 swing about their axis 68—70, compressing their respective springs.

Figure 7:
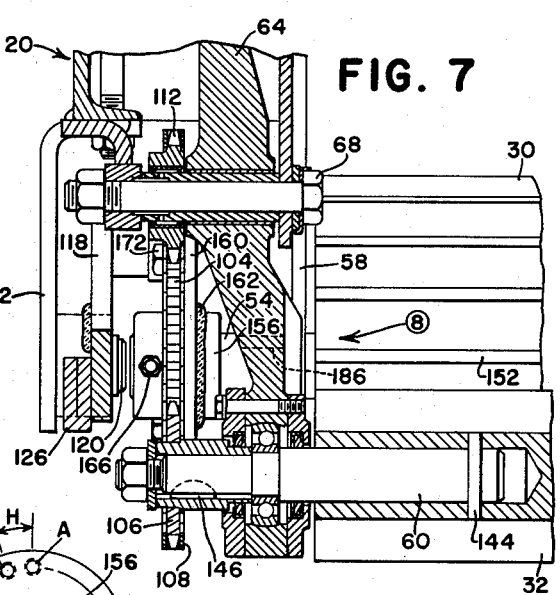
FIG. 7 is a fragmentary section as seen generally along the line 7—7 of FIG. 3.
Figure 9:
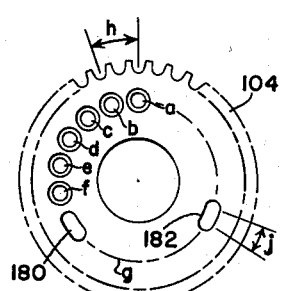
FIG. 9 is a view of one of the driving sprockets.

As previously pointed out, one distinction of the machine presently disclosed over that disclosed in the above-noted Cunningham patent is that in the present case the rolls 30 and 32 are positively driven as distinguished from relying for driving on the mesh of their teeth. Before discussing the relationship of the meshing teeth, it may be well to describe briefly the remainder of the drive which, in this case, is at the end of the machine opposite from that at which the drive 48—50—52 is established. Now, and omitting details for the moment, the front roll 32 has coaxially connected thereto a large sprocket 104. A smaller sprocket 106 is coaxially keyed to the left hand stub shaft 60 for the small roll 32. A driving chain 108 is used to connect these sprockets and in addition this chain is trained about front and rear idler sprockets 110 and 112 respectively. The idler 12 is coaxially mounted on the pin 68 which establishes the pivot for the left hand carrier 64 (FIG. 7).

The front idler 110 is journalled by means of a short shaft 114 on a fore part or portion 116 of a generally fore-and-aft extending support arm 118 which is rockably mounted intermediate its ends on a stub shaft or pin 120 at the lower end of a depending bracket 122. This bracket is rigidly secured to the left hand portion of the main frame 20 and its disposition is such that the pivot pin or stud 120 is coaxial with the shaft 54 for the large roll 30. The arm 118 extends rearwardly of the front sprocket 104 and has its rear end provided with a pivot pin 124 which is connected by a strap 126 to a threaded rod 128. This rod extends upwardly and rearwardly and is received through an apertured member 130 rigid on the rear portion of the frame 20. The rod is headed at 132 and biasing means in the form of a coiled compression spring 134 is interposed beneath the undersurface of the head 132 and the upper surface of the member 130, thus establishing a spring load which tends to swing the fore portion 116 of the arm 118 downwardly. Adjustable stop means in the form of a pair of nuts 136, threaded on the rod 128 beneath the member 130, establishes a limit on the upward movement of the rear portion of the arm 118 and therefore establishes a limit on the downward movement of the fore portion 116 of the arm 118.

The relationship among the several sprockets 104, 106, 110 and 112 and the manner in which the chain 108 is trained thereabout is of significance. As will be seen, the front idler 110 is ahead of the front sprocket 104 and the rear sprocket 112 is to the rear of the front sprocket. Further, the two idlers are above the front sprocket, in a general sense. In addition, the rear idler 112 is above and intermediate the axes of the front and rear sprockets 104 and 106. The chain is trained about the sprockets so that it has an upper run 138 extending between the tops of the idlers 110 and 112. The chain further has a downward run 140 extending from the back of the idler 112 to the back of the rear roll sprocket 106, extending thence around and under the sprocket 106 into a lower run 142 which, in extending from the bottom and front of the sprocket 106 to the bottom of the front idler 110 is wrapped over the top of the front sprocket 104. This not only establishes the proper counter-rotation of the rolls 30 and 32 (clockwise for the roll 32 and counterclockwise for the roll 30 as seen in FIGS. 1–5) but enables the chain to accommodate bodily displacement of the roll 32 relative to the roll 30 as the carrier control springs yield under load.

As already noted, the rear idler 112 is coaxial with the pivot axis 68—70 of the rear roll carrier or mounting means 64—66. As also already noted, the arm 118 is controlled by the means 128—136 in such manner that the front idler 110 is disposed in such manner as to take the slack out of the chain 108. At the same time, since the stops 136 engage the member 130, the chain is not normally under spring load from the spring 134. As the lower roll 32 is displaced rearwardly, moving with the carrier means 64—66 as that means swings about the axis 68—70, the stretch of chain 142 tends to be elongated. However, the arm 118 may swing in a clockwise direction as seen in FIG. 4 so as to elevate the front idler 110, the fore part 116 of the arm 118 moving of course in an arc about the pivot 120. This in effect decreases the distance between the idlers 114 and 112. The spring 134 at this time will of course be compressed. When the overload passes, the rear roll will return to its normal operating position and the stops 136 will again engage the member 130 to restore the initial position of the arm and the initial relationship of the chain to its sprockets. In brief, as the carrier means moves, the rear sprocket 106 travels in an arc about the pivot 68 and the front idler 110 travels in an arc about the pivot 120. Hence, as the sprocket 106 moves away from the sprocket 104, the idler sprocket 110 moves closer to the idler sprocket 112.

As best seen in FIG. 7, the stub shaft 60 may be fixed to the rear or smaller roll 32 as by a cross pin 144, and the sprocket 106 may be connected to the end of the shaft as by a key 146. Because of manufacturing errors and other causes, the angular relationship of the pin 144 and key 146 may not always be the same, as respects each other or as respects the angular relationship of the teeth 148 on the roll 32. These teeth are similar to those in the above-noted Cunningham patent and are relatively widely circumferential spaced apart so as to leave relatively large pockets 150 therebetween. In the present case, there are eight such teeth or flutes on the small roll 32; although, this number, of course, can be varied. However, the relationship thereof to the teeth on the large roll is significant, as is the relationship between the front and rear sprockets 104 and 106. In the present case, the front roll 30 has eighteen teeth 152 which are relatively widely circumferentially spaced apart at uniform distances so as to provide a plurality of intervening pockets 154 with which the teeth 148 of the small roll 32 mesh or interdigitate as the rolls turn in counter-rotation. In other words, the mesh between the teeth is relatively loose. Nevertheless, it is desired that the "mesh" of these teeth be properly timed. In this case, proper timing requires that each tooth 148 centers in a pocket 154 and the same should obtain for the teeth 152 and pockets 150. There are eighteen teeth 152 on the roll 30 and eight teeth 148 on the roll 32. If the sprockets 104 and 106 are perfectly matched with the respective rolls, and with each other as to pitch, pitch diameter, ratio, etc., the proper mesh of the rolls is assured.

By way of example, and following the pattern set by the rolls 30 and 32, which have outside diameters of nine and four inches respectively, the sprockets 104 and 106 have pitch diameters at the same ratio; viz., the pitch diameter of the sprocket 104 is 7.171 inches and it has thirty-six teeth and a pitch (chordal distance between neighboring teeth on the pitch diameter) of .625 inch. The sprocket 106 has sixteen teeth and of course the same pitch. If the chain 108 is a single pitch chain (which it is here), it has the same pitch. However, it is recognized that a double-pitch chain can be used with single-pitch sprockets.

But such perfect relationship among sprockets and rolls is, as a practical matter, seldom if ever achieved, for angular misalinement of the roll 30 and sprocket 104 because of manufacturing errors, etc. occurs more often than not. It therefore appears that the simplest solution is to provide some form of connection between the sprocket 104 and roll 30 by means of which the sprocket could be turned angularly relative to the roll or vice versa about their common axis. Actually, this is a partial solution, but a complete solution must involve some form of means for retaining accurate adjustment once it is achieved, since it is found that simple lost-motion means coupled with fasteners will not withstand severe usage of the machine. According to the present invention, a complete solution is afforded by mounting the sprocket 104 on a hub 156 which itself is keyed at 158 to the roll shaft 54. This hub carries a circular plate or disk 160, welding, as at 162, being relied upon to rigidly interconnect the disk and hub. In addition to the key 158, the hub may be provided with a pair of tapped bores 164 for receiving set screws, one of which is shown at 166 in FIG. 7.

Figure 10:
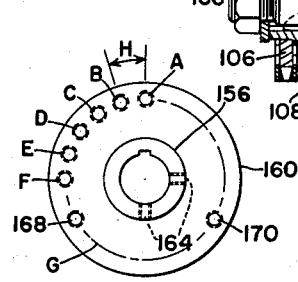
FIG. 10 is a view of the hub for the driving sprocket.

The disk 160, as assembled to its hub 156, is shown by itself in FIG. 10, wherein it is also shown that this disk has therein a plurality of holes A, B, C, D, E, and F, which together represent a first set of holes which are uniformly spaced apart by angular increments on an arc which forms part of what may be regarded as a bolt circle G. In the present case, and for reasons to be explained below, the angular increment between each pair of holes in the set A–F is eighteen degrees, which is represented here by the angle H. The arcuate range of the set of holes A–F is therefore only ninety degrees, which utilizes only a relatively small portion of the disk 160. In addition to the holes, A–F, the disk 160 has therein in angularly spaced relation to this set of holes, a pair of additional holes 168 and 170. Each of the holes A–F, 168 and 170, is a tapped bore for receiving set screws 172, 174 and 176. At this point, it might be noted that although the hub and disk are described and preferably provided as being in the specific nature disclosed, any equivalent part at the proximate end of the roll 30 would suffice.

Figure 11:
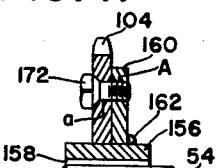
FIG. 11 is a section as seen substantially on the line 11—11 of FIG. 3.

Such part is cooperative with the sprocket 104, which represents another part, the two being relatively angularly adjustable because the sprocket is initially turnable about the hub 156. For the purpose of relating the sprocket in final assembly to the disk 160, and consequently to the roll 30, the sprocket is provided with a plurality of holes a, b, c, d, e and f, which represent a second set of holes on an arc which is part of what may be regarded as a bolt circle g. The two circles G and g are of the same diameter. The holes a–f are spaced apart at an angular increment different from the angular increment H between the holes in the set A–F. This angular increment is represented here at h and in the actual structure is twenty degrees as compared with eighteen degrees for the angle H. Each of the holes a–f is of the countersunk type and the set screw 172 is of the type having a conical surface under its head (FIG. 11) so that accurate positioning is obtainable. In addition to the set of holes a–f, the sprocket has therein a pair of arcuate slots 180 and 182, each of which lies on the bolt circle g and each of which has an arcuate length j (measured center to center) equal to the product of the number of spaces (five) between holes in either set A–F or a–f and the difference between the angular increments H and h. In other words, the angle j is ten degrees; the number of spaces in either set is five and the difference in angle between H and h is two degrees (twenty minus eighteen).

In short, the angle j represents the total range of angular adjustment of the roll 30 relative to the sprocket 104 (360° divided by thirty-six teeth equals 10° which equals one pitch on the sprocket 104), and this angular adjustment is provided in five increments of two degrees each. As a practical matter, the slots should be made a little longer to accommodate manufacturing errors, etc.

The roll 30 is described as being adjustable relative to the sprocket because it must be remembered that when the chain is trained about all of the sprockets, everything but the roll 30 is fixed, bearing in mind that the other end of the roll shaft 54 is connected by its chain 50 to the input gearing in the housing 38 and this is ultimately connected to the tractor PTO. Therefore, with the set screw 172 removed and the other set screws 174 and 176, which are passed through the slots 180 and 182 respectively into the tapped bores 168 and 170, loosened, the roll 30 may be turned by hand until its teeth are properly meshed, the predetermined status of which has already been described; that is, a tooth 148 of the small roll must be centered in a pocket 154 of the large roll; or vice versa.

Figure 8:
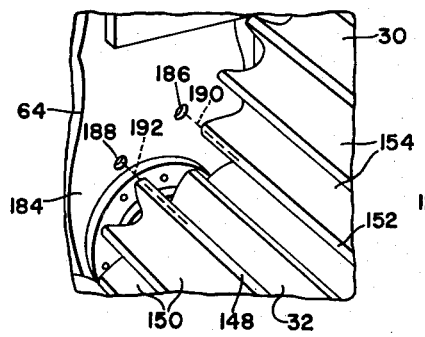
FIG. 8 is a fragmentary perspective as seen generally in the direction of the arrow bearing the encircled numeral 8 in FIG. 7.

On the basis of the diameter of the roll 30 (nine inches) and other factors already given, a change of two degrees between the roll 30 and sprocket 104 incurs a linear movement at the tip of a tooth 152 of .157″ (approximately $5/32''$, calculated as $$X=2(4.5) \sin 1°=2(4.5)(.01745)=.157$$

wherein X=movement at the tooth tip, 4.5″ is the radius of the roll 30 and 1° is one-half of 2°. To facilitate this timing of rolls, the invention provides indicator means, which is represented by a portion 184 of the left hand carrier 64 which radially overlaps end portions of the rolls 30 and 32. As best seen in FIG. 8, this portion 184 has therein a pair of indicator elements in the form of holes or apertures 186 and 188, which are drilled therein at predetermined positions representing register or alinement with the respective teeth 152 and 148 in a convenient area of the roll relationship. These apertures could be provided elsewhere, but, since the teeth on the rolls are uniformly spaced, the particular location does not depend upon any other characteristic of the rolls than the teeth and the spacing thereof. As suggested by the dotted lines 190 and 192 in FIG. 8, the rolls are properly timed when one tooth 152 of the roll 30 lines up or registers with the hole 186 and one tooth 148 of the roll 32 lines up or registers with the hole 188.

For the purpose of easily explaining the relationship of the sprocket and disk 160 and the manner in which they can be angularly adjusted, let it be assumed that the two are assembled in an initial position in which the cap screws 174 and 176 are passed respectively through the slots 180 and 182 in the sprocket 104 and are threaded respectively into the tapped bores 168 and 170 in the disk 160, albeit loosely so that angular adjustment can be achieved. With the position of the sprocket 104 fixed by the chain and drive connections as already described, the roll 30 can now be rocked relative to the sprocket. In the assumed initial position, it can be supposed that the hole $a$ in the sprocket 104 is in register with the hole A in the disk 160. A check of the timing of the mesh of the teeth at the indicator means 184 may show that the mesh is correct. If so, the cap screw 172 is passed through the alined holes $a$ and A and tightened, followed by tightening of the cap screws 174 and 176, which therefore fixes the relationship between the sprocket and roll 30, a relationship that will always be maintained until disassembly.

If, however, the timing of the rolls is not correct, the cap screw 172 will be removed and the cap screws 174 and 176 will be loosened. The roll 30 may now be turned by hand relative to the fixed sprocket until proper timing is achieved. If timing was off merely .157 inch, then it will be expected that hole $b$ in sprocket 104 will register with tapped bore B in the disk 160, since this will represent relative movement of two degrees between the sprocket and the disk, on the basis of what was said above. At this point it will be noted that there is register only between the holes $b$ and B. In the initial assumed position, there was register only between the holes $a$ and A. The successive register of only one hole in each set with only one hole in the other set will occur throughout the six positions, because of the two degree difference in the angular increments H and $h$. As pointed out above, this two degree difference multiplied by the number of increments (five) in either set gives the total angular length of the slots 180 and 182, which has previously been described as $j$ (ten degrees).

An extreme condition may now be assumed; that is, one in which a tooth 148 of the roll 32 is in contact with a tooth 152 of the roll 30. Since in the present case, there are eighteen teeth on the roll 30, these teeth will be uniformly angularly spaced apart at increments of twenty degrees. However, because of the thickness of each tooth, the angular distance between teeth will be somewhat less than twenty degrees. As already described, the pitch of the teeth is 1.5708 inches, but here again this distance is measured between points or lines. On the other hand, for all practical purposes, the distance between a pair of neighboring teeth 152 may be regarded as on the order of 1.5708 inches and the angular increment is roughly twenty degrees. As pointed out, each increment of two degrees represents .157 inch on the circle that includes the tips of the teeth 152. Hence, if the maximum length of each of the slots 180 and 182 is ten degrees (five increments), this will give a range of movement of .785 inch of movement for a tooth 152 relative to a tooth 148; and .785 inch is roughly one-half of 1.5708 inches, the pitch of the teeth 152 (with allowance made for tooth thickness). In other words, the angular range of relative adjustment permitted by the number and length of increments is sufficient to permit movement of a tooth 152 from an extreme position to a central position. If the direction of the out-of-mesh condition is opposite, the chain 108 may be disengaged from the sprocket 104 and shifted one pitch, which is here .625 inch. This will cause the cap screws 174 and 176 to shift to the opposite ends of their respective slots, since ten degrees in each slot represents .625 inch on the chain. From this condition, the roll 30 may be adjusted back to its proper meshing relationship with the teeth on the roll 32.

As illustrated in FIGS. 3 and 4, it is assumed that a proper meshing relationship is obtained when the hole $a$ in the sprocket 104 is in register with the hole A in the disk 160, and the cap screw 172 is employed to fix this relationship, in addition to tightening of the other cap screws 174 and 176. It will be clear from these figures, then, that the cap screws 174 and 176 are in what may be regarded as the forward ends of their respective slots, and it will further be seen that the other holes $b$–$f$ are out of register respectively with the other holes B–F. Hence, regarding the relationship as capable of affording six positions, it follows that in the first of these positions holes $a$ and A are in register; in the next successive or second position, holes $b$ and B are in register; in the next successive or third position, holes $c$ and C are in register; and so forth. This means thus provides for incremental angular adjustment of the roll 30 relative to the sprocket 104 and in addition includes releasable securing means which when tightened are effective to maintain the adjustment against slippage or other causes. The indicator means provides a convenient system for checking timing of the teeth and control of the chain by the idlers, as described above, completes a highly efficient driving, mounting and adjusting structure.

Features of the invention in addition to those categorically enumerated will readily occur to those versed in the art, as will many modifications and alterations in the preferred design disclosed, all of which may be achieved without departure from the spirit and scope of the invention.

What is claimed is:

1. In a crop conditioner having a fore-and-aft main frame: a transverse front roll journaled on the frame; a rear roll closely paralleling the front roll; carrier means journaling the rear roll and mounted on the frame on a transverse pivot axis spaced above the axes of the rolls and carrying the rear roll for fore-and-aft swing toward and away from the front roll; biasing means acting on the carrier means for normally holding the rear roll toward the front roll; front and rear sprockets coaxially fixed respectively to the front and rear rolls; a rear idler journaled on the frame on the pivot axis of the carrier means; a support arm rockable on the frame on the axis of the front roll and including a fore portion ahead of the front sprocket; a front idler journaled on said fore portion; a drive chain trained about said sprockets and idlers in such manner as to extend from the top of the front idler to the top of the rear idler, thence downwardly to and under the rear sprocket, thence upwardly behind and forwardly over the top of the front sprocket and forwardly to the bottom of and thence around the front of the front idler; and arm control means acting between said arm and the frame for holding the fore portion of said arm normally downwardly, said arm control means including a yielding element enabling rocking of said arm to raise said fore portion when the rear roll moves away from the front roll.

2. The invention defined in claim 1, in which: said arm control means includes a stop acting on said arm to prevent downward rocking thereof beyond a predetermined position.

3. In a crop conditioner having a fore-and-aft main frame: a transverse front roll journaled on the frame; a rear roll closely paralleling the front roll; carrier means journaling the rear roll and mounted on the frame on a transverse pivot axis spaced above the axes of the rolls and carrying the rear roll for fore-and-aft swinging toward and away from the front roll; biasing means acting on the carrier means for normally holding the rear roll toward the front roll; front and rear sprockets coaxially fixed respectively to the front and rear rolls; a rear idler journaled on the frame on the pivot axis of the carrier means; a support arm rockable on the frame on the axis of the front roll and including fore and rear portions respectively ahead of and behind the front sprocket; a front idler journaled on said fore portion; a drive chain trained about said sprockets and idlers in such manner as to extend from the top of the front idler to the top of the rear idler, thence downwardly to and under the rear sprocket, thence upwardly behind and forwardly over the top of the front sprocket and forwardly to the bottom of and thence around the front of the front idler; and arm control means acting between the rear portion of said arm and the frame for holding the fore portion of said arm normally downwardly, said arm control means including a yielding element enabling rocking of said arm to raise said fore portion when the rear roll moves away from the front roll.

4. In a crop conditioner having a fore-and-aft main frame: a transverse front roll journaled on the frame; a rear roll closely paralleling the front roll; carrier means journaling the rear roll and movably mounted on the frame to carry the rear roll for fore-and-aft movement toward and away from the front roll; biasing means acting on the carrier means for normally holding the rear roll toward the front roll; front and rear sprockets coaxially fixed respectively to the front and rear rolls; a rear idler journaled on the frame on a fixed axis closely above the rear sprocket; a support arm rockable on the frame on the axis of the front roll and including a fore portion ahead of the front sprocket; a front idler journaled on said fore portion on an axis relatively closely ahead of and above the front roll axis; a drive chain trained about said sprockets and idlers in such manner as to extend from the top of the front idler to the top of the rear idler, thence downwardly to and under the rear sprocket, thence upwardly behind and forwardly over the top of the front sprocket and forwardly to the bottom of and thence around the front of the front idler; and arm control means acting between said arm and the frame for holding the fore portion of said arm normally downwardly, said arm control means including a yielding element enabling rocking of said arm to raise said fore portion when the rear roll moves away from the front roll.

5. In a crop conditioner having a fore-and-aft main frame: a transverse front roll journaled on the frame; a rear roll closely paralleling the front roll; carrier means journaling the rear roll and movably mounted on the frame to carry the rear roll for fore-and-aft movement toward and away from the front roll; biasing means acting on the carrier means for normally holding the rear roll toward the front roll; front and rear sprockets coaxially fixed respectively to the front and rear rolls; a rear idler journaled on the frame above the rear sprocket; a support arm rockable on the frame on a fixed transverse axis above and closely ahead of the rear sprocket and including a fore portion ahead of the front sprocket; a front idler journaled on said fore portion on an axis relatively closely ahead of and above the front roll axis; a drive chain trained about said sprockets and idlers in such manner as to extend from the top of the front idler to the top of the rear idler, thence downwardly to and under the rear sprocket, thence upwardly behind and forwardly over the top of the front sprocket and forwardly to the bottom of and thence around the front of the front idler; and arm control means acting between said arm and the frame for holding the fore portion of said arm normally downwardly, said arm control means including a yielding element enabling rocking of said arm to raise said fore portion when the rear roll moves from the front roll.

6. In a crop conditioner having a fore-and-aft main frame: a transverse front roll journaled on the frame; a rear roll closely paralleling the front roll; carrier means journaling the rear roll and movably mounted on the frame to carry the rear roll for fore-and-aft movement toward and away from the front roll; biasing means acting on the carrier means for normally holding the rear roll toward the front roll; front and rear sprockets coaxially fixed respectively to the front and rear rolls; front and rear idlers spaced apart fore and aft and disposed above the front and rear sprockets; means mounting said idlers on the frame; a drive chain trained about said sprockets and idlers in such manner as to extend from the top of the front idler to the top of the rear idler, thence downwardly to and under the rear sprocket, thence upwardly behind and forwardly wrapped over the top of the front sprocket and forwardly to the bottom of and thence around the front of the front idler; means other than the chain for directly driving the front sprocket in such direction as to tension only that portion of the chain that extends upwardly from the rear sprocket to the front sprocket; one of said idler mounting means being movable relative to the sprockets to accommodate rearward movement of the rear roll; and means yieldingly opposing movement of said one idler mounting means.

7. In a crop conditioner having a main frame: first and second counter-rotating conditioner rolls; means journaling the rolls on the frame and including a yielding mount enabling one roll to move away from the other roll; first and second sprockets coaxially fixed respectively to the rolls; a first idler spaced above and to the side of the first sprocket away from the second sprocket; a second idler spaced above and to the opposite side of the first sprocket; a drive chain trained over said idlers and sprockets and including a top run between the tops of the idlers and above the first sprocket, a downward run from the second idler to, under and around the second sprocket, and a lower run from the second sprocket to the first idler and including a portion wrapped over the top of the first sprocket and a driving portion extending from the wrapped portion to the second sprocket; means mounting one idler on the frame; means other than the chain for directly driving the second sprocket in such direction as to tension said driving portion of said lower run; and means mounting the other idler on the frame for normally holding a certain position of said other idler to maintain a predetermined tension in said chain, said last-named means including a yielding device enabling movement of said idler out of said certain position to accommodate movement of one roll away from the other roll.

8. In a crop conditioner having a fore-and-aft main frame: a transverse front roll journaled on the frame; a rear roll closely paralleling the front roll; carrier means journaling the rear roll and mounted on the frame on a transverse pivot axis spaced above the axes of the rolls and carrying the rear roll for fore-and-aft swinging toward and away from the front roll; biasing means acting on the carrier means for normally holding the rear roll toward the front roll; front and rear sprockets coaxially fixed respectively to the front and rear rolls; a rear idler journaled on the frame on the pivot axis of the carrier means; bracket means on the frame and including a pivot generally in transverse alinement with the front sprocket; a support arm rockable on said pivot and including a fore portion ahead of the front sprocket; a front idler journaled on said fore portion; a drive chain trained about said sprockets and idlers in such manner as to extend from the top of the front idler to the top of the rear idler, thence downwardly to and under the rear sprocket, thence upwardly behind and forwardly over the top of the front sprocket and forwardly to the bottom of and thence around the front of the front idler; and arm control means acting between said arm and the frame for holding the fore portion of said arm normally downwardly, said arm control means including a yielding element enabling rocking of said arm to raise said fore portion when the rear roll moves away from the front roll.

9. In a crop conditioner having a main frame including spaced apart roll supports: first and second conditioner rolls extending between and carried at opposite ends by the supports for counter-rotation and respectively having uniformly circumferentially spaced teeth running lengthwise thereof and adapted to loosely mesh as the rolls rotate, said roll ends being radially overlapped by portions of the supports in the area of the mesh of said teeth; a first sprocket coaxially fixed to the first roll axially outwardly of the associated support; a second sprocket coaxial with the second roll in the plane of the first sprocket; a drive chain engaging the sprockets; means connecting the second sprocket to the second roll for normal rotation of the two in unison, said means being releasable to free the second roll for turning about its axis relative to the sprockets, chain and first roll so as to enable angular adjustment in the mesh of the teeth of the rolls; and indicator means carried by at least one of the supports in the aforesaid area of mesh and including a first element adapted to register with a tooth of the first roll and a second element spaced from said first element in a direction transversely of the roll axes and adapted to register with a tooth of the second roll when said second roll is adjusted to establish a predetermined mesh of its teeth with those of the first roll.

10. The invention defined in claim 9, in which: said first and second elements respectively comprise first and second apertures in said one support and adapted to register endwise with said teeth of the respective rolls.

11. In a crop conditioner having a main frame: first and second conditioner rolls carried by the frame for counter-rotation and respectively having uniformly circumferentially spaced teeth running lengthwise thereof and adapted to loosely mesh as the rolls rotate; a first sprocket coaxially fixed to the first roll; a second sprocket coaxial with the second roll; a drive chain engaging the sprockets; and means connecting the second sprocket to the second roll, including cooperative radial parts respectively coaxially on the second roll and the second sprocket and releasable securing means normally securing the parts together for rotation of the second roll and second sprocket in unison, one of said parts having therein a first set of holes spaced apart on a concentric arc at uniform angular increments and said other part having therein a second set of holes equal in number to the first set and spaced apart on a similar arc at uniform angular increments different from those of the first set to provide a series of positions of relative angular adjustment of the parts including a given position in which only one hole of one set registers with only one hole of the other set and successive positions in each of which only the next successive hole of said one set registers with only the next successive hole of the other.

12. The invention defined in claim 11, in which: one part has a fastener element thereon spaced from its set of holes and projecting therefrom to the other part and said other part has an arcuate slot therein receiving said element and within which said element travels angularly as the second roll is adjusted angularly relative to the second sprocket, said slot being of such angular length as to accommodate said travel of said element through an angle substantially equal to the product of the number of increments in a set and the difference in angle between the increment of one set of holes and that of said other set of holes.

13. The invention defined in claim 11, in which: the chain has interconnected links having a predetermined pitch and the total range of relative angular adjustment of said second roll is equal to the angle between neighboring teeth on the sprocket.

References Cited in the file of this patent

UNITED STATES PATENTS

| | | |
|---|---|---|
| 2,811,819 | Heth | Nov. 5, 1957 |
| 2,924,927 | Pristo | Feb. 16, 1960 |
| 2,963,841 | Cunningham | Dec. 13, 1960 |